(12) United States Patent
Dering et al.

(10) Patent No.: US 8,857,207 B2
(45) Date of Patent: Oct. 14, 2014

(54) REFRIGERANT DRYER

(75) Inventors: Kristian Dering, Coburg (DE); Michael Feisthauer, Meeder (DE); Andreas Fredenhagen, Coburg (DE); Andreas Foerster, Dörfles-Esbach (DE); Klaus-Ulrich Kobelt, Bamberg (DE)

(73) Assignee: Kaeser Kompressoren SE, Coburg (DE)

( * ) Notice: Subject to any disclaimer, the term of this patent is extended or adjusted under 35 U.S.C. 154(b) by 808 days.

(21) Appl. No.: 12/579,046

(22) Filed: Oct. 14, 2009

(65) Prior Publication Data

US 2010/0180611 A1 Jul. 22, 2010
US 2011/0061409 A2 Mar. 17, 2011

(30) Foreign Application Priority Data

Oct. 15, 2008 (EP) .................................... 08166640

(51) Int. Cl.
| | |
|---|---|
| *F25D 11/00* | (2006.01) |
| *F25D 17/06* | (2006.01) |
| *F25D 17/02* | (2006.01) |
| *F28D 20/02* | (2006.01) |
| *B01D 53/26* | (2006.01) |

(52) U.S. Cl.
CPC .............. *B01D 53/265* (2013.01); *F28D 20/02* (2013.01); *F25B 2400/24* (2013.01); *Y02E 60/145* (2013.01)
USPC .................................... 62/437; 62/93; 62/434

(58) Field of Classification Search
USPC .................. 62/115, 185, 434, 437, 510, 513; 165/100
See application file for complete search history.

(56) References Cited

U.S. PATENT DOCUMENTS

| | | | |
|---|---|---|---|
| 5,228,504 | A | 7/1993 | Mantegazza et al. |
| 6,691,527 | B2 | 2/2004 | Bureau et al. |

(Continued)

FOREIGN PATENT DOCUMENTS

| | | |
|---|---|---|
| DE | 37 06 949 A1 | 9/1988 |
| DE | 199 43 109 C1 | 12/2000 |
| EP | 0 405 613 B1 | 6/1995 |
| EP | 1 081 445 A2 | 3/2001 |

(Continued)

*Primary Examiner* — Brandon M Rosati
*Assistant Examiner* — Jon T Schermerhorn
(74) *Attorney, Agent, or Firm* — Panitch Schwarze Belisario & Nadel LLP

(57) ABSTRACT

A refrigerant dryer, in particular a compressed air refrigerant dryer, is provided for drying a gaseous fluid while cooling the gaseous fluid using a refrigerant. The dryer includes a pressure fluid-refrigerant agent-heat exchanger (30) in which a cooling of the gaseous fluid takes place directly or indirectly by a refrigerant conveyed in a primary loop (16), one or more refrigerant compressor/compressors (24) for operating the primary loop, and a cold accumulator (13) with an accumulator-side heat exchanger (20) which couples an accumulator discharge fluid to a cold accumulator medium (14). The pressure fluid-refrigerant agent-heat exchanger (30) and the cold accumulator (13) are fluidically connected or can be brought into fluidic connection via a discharge loop (15) for an accumulator discharge fluid. The cold accumulator (13) is arranged, relative to gravity, above the pressure fluid-refrigerant agent-heat exchanger (30), in such a manner that the heated accumulator discharge fluid is conveyed through the discharge loop (15) for cooling in the cold accumulator (13), is cooled there, and subsequently re-conveyed to the pressure fluid-refrigerant agent-heat exchanger (30).

26 Claims, 6 Drawing Sheets

(56) References Cited

U.S. PATENT DOCUMENTS

| | | |
|---|---|---|
| 7,040,100 B2 | 5/2006 | Feisthauer |
| 2004/0093889 A1* | 5/2004 | Bureau et al. .................. 62/434 |
| 2004/0206095 A1* | 10/2004 | Feisthauer ...................... 62/93 |
| 2005/0066668 A1* | 3/2005 | Barnwell ......................... 62/93 |
| 2006/0032623 A1* | 2/2006 | Tsubone et al. ............. 165/202 |

FOREIGN PATENT DOCUMENTS

| | | |
|---|---|---|
| EP | 1 081 445 A2 * | 3/2001 |
| EP | 1 221 390 A2 | 7/2002 |
| EP | 1 434 023 A2 | 6/2004 |
| NL | 8401592 A | 12/1985 |

\* cited by examiner

REFRIGERANT DRYER

BACKGROUND OF THE INVENTION

The invention relates to a refrigerant dryer, in particular a compressed air refrigerant dryer for drying a gaseous fluid while cooling the gaseous fluid using a refrigerant. The invention also elates to a method for cooling a gaseous fluid in a refrigerant dryer, in particular a compressed air refrigerant dryer.

Refrigerant dryers are known per se. Reference is made to the document European patent application publication EP 1 434 023 A2 as merely one example. By the term cold drying, a method known per se is understood in general as well as according to the present invention, in which the condensable components are removed from a flow of gas by cooling the gas flow below the respective pressure dew point. The term "pressure dew point" is correspondingly understood as the temperature to which the gaseous fluid can be cooled without liquid condensing out. Cold dryers are used in particular for drying compressed air by cooling the compressed air flow charged with water vapor, partially condensing out the water vapor by the cooling process, and subsequently separating the water that has condensed out. Fields of application for "dried" compressed air are, for example, freeze prevention and corrosion protection in compressed air ducts, compressed air-driven tools and other similar applications.

It is, however, problematic to provide an energy-efficient control of the cooling capacity of a refrigerant dryer, since this control has to be effected in adaptation to variable pressure fluid volume flows, pressure fluid moistures and/or pressure fluid temperatures. Numerous methods are already known for controlling the cooling capacity of a refrigerant dryer, e.g., controls with hot gas bypass valves or controls with speed control of the refrigerant compressor. While the hot gas bypass control has a relatively poor energy efficiency, it is the limited range of control for the speed control which is problematic in most cases.

Furthermore, there are control methods which are based on switching the refrigerant compressor ON/OFF, wherein the pressure fluid temperature has to be kept as constant as possible at the condensate separator inflow irrespective of the ON/OFF switching operations of the refrigerant compressor, in order to obtain a pressure dew point which is as constant as possible.

For aiding or even enabling such an ON/OFF control of the refrigerant compressor, the provision of a cold accumulator is already known, which may be in the form of sand according to the state of the art. European Patent EP 0 405 613 B1 even proposes in this context the use of moist sand for further increasing the capacity of the cold accumulator.

Energy efficiency in the present context is to be understood as a favorable relationship between the electrical energy used and the amount of pressure fluid obtained, with an almost constant maintaining of a specified pressure dew point being assumed. An ON/OFF control in an expedient structural implementation is highly efficient but problematical with respect to maintaining a constant temperature of the pressure fluid at the condensate separator inflow.

The circuits of the refrigerant compressor are triggered in the ON/OFF control depending on the pressure fluid temperature measured at the condensate separator inflow or on other physical parameters directly or indirectly related thereto (e.g., evaporating pressure, temperature in the accumulator, temperature in the pressure fluid-refrigerant agent-heat exchanger, pressure dew point of the pressure fluid). In some cases, even several of these parameters are evaluated simultaneously and/or in a combination or weighting depending on the operating state for determining the switchpoints.

In all cases, an actually undesired hysteresis of the pressure fluid temperature has to be accepted at the condensate separator inflow, which should be minimized to a reasonable degree as far as possible, while at the same time limiting the operating cycles. This hysteresis is substantially determined by the following factors:

(1) operating cycles of the refrigerant compressor. The number of switching operations is critical to or limiting of the service life of the refrigerant compressor and increases with a decreasing hysteresis of the switchpoints;

(2) capacity of the cold accumulator;

(3) temperature gradients between the evaporating refrigerating agent, the thermal accumulator mass and the pressure fluid flow when charging or discharging the cold accumulator. These result from the heat flows to be exchanged and the construction-contingent heat transitions and heat transfers. The maximum exchanging heat flows are on an order of magnitude of the cooling capacity, with the accumulator on the one hand being forced to take up the entire cooling capacity when the refrigerant compressor is switched on under no pressure fluid flow and is forced to output it again when the refrigerant compressor is switched off under a full pressure fluid flow.

In order to keep this undesired temperature hysteresis as low as possible, despite limited refrigerant compressor operating cycles, large capacities of the cold accumulator are necessary at simultaneously good heat transfers (i.e., low temperature differences) between the evaporating refrigerant agent, the thermal accumulator mass within the cold accumulator and the pressure fluid flow, which poses structurally contradictory requirements and hence is problematic.

Since the spatial temperature gradients have an oppositely-directed progression when the cold accumulator is charged and discharged, the effects of the temperature differences will add up in the temperature hysteresis of the pressure fluid at the condensate separator inflow. In addition, large temperature differences during heat transfer are basically disadvantageous to the energy efficiency since they are associated with a high "energy production."

To reduce the temperature differences, large and efficient heat exchanger surfaces are desirable between the evaporating refrigerant agent, the thermal accumulator mass and the flowing pressure fluid. In combination with the likewise required large capacity of the cold accumulator, this poses problems as to the structural space and arrangement of the components and heat exchanger surfaces. The problem hence includes finding a structural configuration by which large efficient heat exchanger surfaces, short heat conduction paths having a high thermal conduction coefficient, and large or voluminous cold accumulators may be obtained simultaneously with a small structural space and expenditure.

To solve this problem, the already mentioned European Patent EP 0 405 613 B1 proposes that the accumulator mass disclosed therein be embedded in the gaps of finned tube packets in the form of moist sand, the packets being interspersed by sets of tubes in which flow the pressure fluid and the evaporating refrigerant respectively. Therein, an acceptable heat transfer is achieved between the evaporating refrigerant and the pressure fluid through the metallic heat conduction paths, an acceptable size for the accumulator mass, and an embedding of the accumulator mass in direct spatial proximity and at an acceptable heat transfer both to the evaporating refrigerant agent as well as to the flowing pressure fluid. The larger these prior art cold dryers have to be dimensioned, the less favorable the cost structure becomes as a result of the necessarily large and expensive heat exchangers, which moreover require expensive raw materials such as copper and aluminum.

BRIEF SUMMARY OF THE INVENTION

Compared to the above, the object of the present invention comprises providing a refrigerant dryer and a method of cold-drying a gaseous fluid in a refrigerant dryer in which a higher energy efficiency, therefore a more favorable relationship of the energy used, in particular electric energy, is achieved in relation to the amount of dried pressure fluid.

A central idea of the present invention is that the pressure fluid-refrigerant agent-heat exchanger and the cold accumulator are fluidically connected or may be brought into fluidic connection via a discharge loop for an accumulator discharge fluid in such a manner that the accumulator discharge fluid having an increased heat content is conveyed through the discharge loop for heat emission to the cold accumulator, emits heat there, and subsequently, having a reduced heat content, is conveyed again to the pressure fluid-refrigerant agent-heat exchanger.

In terms of the method, the present invention is characterized by the following steps, which may also be carried out in a repeating or alternating manner:

(a) cooling the cold accumulator by the excess cooling capacity of the refrigerant of the primary loop in operating states in which the cooling of the gaseous fluid does not require any or only a fraction of the available cooling capacity, and (b) discharging the cold accumulator and cooling the gaseous fluid using the accumulator discharge fluid by a heat or cold transfer between the pressure fluid-refrigerant agent-heat exchanger and cold accumulator in operating states in which the cooling of the gaseous fluid is not or is only partially caused by the cooling capacity of the primary loop, wherein during the circulation of the accumulator discharge fluid, it is subjected—if necessary influenced by control elements—to cyclic phase transitions between liquid and vapor at a substantially equal pressure level.

In this respect, it is proposed according to the invention to provide an accumulator discharge fluid or general refrigerant in a refrigerant dryer, and in a method of cold-drying a gaseous fluid respectively, which enables cold transfer from a cold accumulator which may also be spatially distant therefrom, if needed. This results in essentially higher freedom with respect to the configuration and dimensioning of the cold accumulator and the selection of a suitable cold accumulator medium. By the herein proposed refrigerant dryer, the herein proposed method respectively, the energy efficiency can moreover be decisively enhanced, in particular in part load or zero load situations.

A similar principle has already been proposed in the field of air conditioning. In this respect, reference is made to European patent application publication EP 1 221 390 A1, in which an air conditioning system for a motor vehicle having a cold accumulator is described. However, the conditions and problems faced by a refrigerant dryer, in particular a compressed air refrigerant dryer, are not comparable to those in an air conditioning system for a motor vehicle. While actually achieving a cooling capacity even when the primary loop is in standstill state is desired in a motor vehicle air conditioning system, initially decisive to a refrigerant dryer is, on the one hand, efficient cooling capacity and, on the other, maintaining a constant pressure dew point. Particularly in the mentioned ON/OFF control, this is not a trivial problem. The control range in compressed air refrigerant dryers is namely very narrow, since the lower limit is determined by the temperature at which the fluid to be condensed out solidifies, hence 0° C. in the case of water.

Preferably, the arrangement is configured and the accumulator discharge fluid is selected such that the accumulator discharge fluid in the accumulator discharge operation condenses while emitting heat to the cold accumulator and evaporates in the pressure fluid-refrigerant agent-heat exchanger while absorbing heat.

The preferably gravity-induced drive of the discharge loop may be exclusive or non-exclusive depending on the specific embodiment of the invention. Preferably, however, it will be gravity-induced, at least for the most part. Other drive mechanisms, may, however, also take part, for example capillary forces or a pump.

In a further preferred embodiment, the discharge loop is essentially only active in those operating phases in which the refrigerant compressor/compressors is/are switched off or is/are operated at a reduced power.

In a preferred embodiment of the refrigerant dryer according to the invention, the primary loop and the discharge loop are fluidically connected, at least on a case-by-case basis, in particular within the pressure fluid-refrigerant agent-heat exchanger, so that the accumulator discharge fluid of the discharge loop and the refrigerant of the primary loop are formed by the same refrigerant.

In an optional embodiment, the arrangement is such that the discharge loop forms in parts of the primary loop on a case-by-case basis and thus is delimited by the flow ducts of the primary loop.

In an alternative, likewise optional embodiment, the primary loop and the discharge loop are configured as loops separated from each other from a fluidic point of view, and are in thermal interaction with each other through a primary loop-transfer-heat exchanger.

In an advantageous specific embodiment of the refrigerant dryer according to the invention, the cold accumulator may, as an option, be spatially separated from the pressure fluid-refrigerant agent-heat exchanger or may be integrated with it into one common component.

In a preferred embodiment, the arrangement is such that the gaseous fluid flows in the flow direction through an air-air-heat exchanger upstream and downstream of the pressure fluid-refrigerant agent-heat exchanger, in such a manner that the gaseous fluid cooled down in the pressure fluid-refrigerant agent-heat exchanger pre-cools the gaseous fluid flowing into the pressure fluid-refrigerant agent-heat exchanger, wherein the pressure fluid-refrigerant agent-heat exchanger and the air-air-heat exchanger are integrated into one common component, and wherein the accumulator-side heat exchanger is realized as a separate individual component or is integrated into one common component together with the air-air-heat exchanger and the pressure fluid-refrigerant agent-heat exchanger.

In a specific embodiment, heat is extracted in a charge state from the cold accumulator by an accumulator-side heat exchanger or a separate loading heat exchanger by an accumulator charging fluid, which may be identical to or separate from the accumulator discharge fluid. In the charge state, the cold accumulator is in active communication with the refrigerant of the primary loop through the accumulator-side heat exchanger and/or a separate loading heat exchanger for cooling the cold accumulator medium, respectively reducing the heat content of the cold accumulator medium.

In a preferred improvement of the present invention, the thermal capacity of the cold accumulator, the cold accumulator medium, respectively, is increased in that the cold accumulator medium performs a phase transition in its operating range, in particular is configured as a so-called latent heat exchanger. Specifically, the cold accumulator medium may consist of a PCM material (phase change material), wherein the utilized phase transition may be, for example, a solid-liquid transition or another otherwise reversible transition, such as a reversible chemical reaction (thermo-chemical heat accumulator), for example, or absorption or desorption processes. Specifically, a cold accumulator medium based on salt or a paraffin may be used.

In a further preferred embodiment, the cold accumulator medium is selected such that its operating range is between −8° C. and 4° C., preferably about 2° C. for structural configurations in which the accumulator-side heat exchanger and the pressure fluid-refrigerant agent-heat exchanger are integrated into one common component, or about −3° C. for structural configurations in which the cold accumulator is spatially separated from the pressure fluid-refrigerant agent-heat exchanger. Especially when water-loaded compressed air has to be dried, there is the considerable risk of icing during the cooling. On the other hand, neither should the temperature level of the cold accumulator medium be too high for maintaining the specified pressure dew point. It has been shown in practical tests that the temperature indicated here achieves an unproblematic operation of the refrigerant dryer at a simultaneously effective cooling capacity.

In a preferred embodiment, means for increasing the thermal conductivity are provided on the accumulator-side heat exchanger and/or on the conceivably additionally provided loading heat exchanger of the cold accumulator and/or in the cold accumulator itself in order to effect the most efficient coupling possible of the accumulator discharge fluid and/or the accumulator charge fluid with the cold accumulator medium of the cold accumulator. Such means may comprise, for example, grooves, ribs, etc. in or on the material of the heat exchanger.

In a further possible embodiment, the means for increasing the thermal conductivity in the cold accumulator are formed in that substances, particles or fibers having high thermal conductivity are incorporated into the cold accumulator medium for improving the effective thermal conductivity in the cold accumulator medium.

A further possible embodiment provides for splitting the refrigerant guide into sections of two parallel tracks in the primary loop, namely a compressed air-side track and an accumulator-side track, wherein the compressed air-side track is guided across the pressure fluid-refrigerant agent-heat exchanger and the accumulator-side track is guided across the cold accumulator. To achieve different evaporation pressures, a separate expansion element and/or similar adjustment elements may be respectively allocated to the compressed air-side track and the accumulator-side track.

Though in principle a cooling of the cold accumulator also seems possible in other ways, it advantageously occurs by the refrigerant conveyed in the primary loop.

In a particularly preferred embodiment of the present invention, the flow paths of the discharge loop are partially or exclusively used for reducing the heat content of the cold accumulator by the refrigerant of the primary loop.

The pressure fluid-refrigerant agent-heat exchanger may be formed such that the gaseous fluid and the refrigerant of the primary loop are conveyed in a countercurrent arrangement, a direct-current arrangement and/or orthogonally to each other.

In one possible specific embodiment, continuous refrigerant ducts in the pressure fluid-refrigerant agent-heat exchanger constitute sections of the discharge loop and extend at least substantially over the entire height of the common component formed by the accumulator-side heat exchanger and the pressure fluid-refrigerant agent-heat exchanger.

In a possible preferred embodiment, the arrangement is such that in the discharge state, a preferably gravity-induced circulation is created within the refrigerant agent ducts in the pressure fluid-refrigerant agent-heat exchanger, so that the refrigerant absorbs heat in the lower area of the refrigerant ducts by the gaseous fluid to be cooled in the compressed air ducts. This refrigerant evaporates and rises in the direction of the cold accumulator with an increased heat content, emits heat there and condenses, and then descends again, preferably under the influence of gravity, after heat emission within the cold-conducting ducts for again cooling gaseous fluid there in the compressed air ducts.

In a specific improvement, compressed air ducts may be arranged, preferably in an alternating manner with the refrigerant ducts, to guide the gaseous fluid within the area of the pressure fluid-refrigerant agent-heat exchanger, and may be in heat-conducting communication with the same. In a specific embodiment, the accumulator-side heat exchanger is configured such that the cold accumulator medium is accommodated within the upper area of the common component between the refrigerant ducts.

Preferentially, the cold accumulator medium may be accommodated within a plurality of sealed chambers which are each formed to be terminally closed duct portions.

In an alternative preferred embodiment, the plurality of chambers in which the cold accumulator medium is accommodated are interconnected by at least one terminally arranged collecting vessel, which preferably includes one or more opening(s) for filling and emptying, respectively.

In a further, optional embodiment, the common component comprising the accumulator-side heat exchanger and the pressure fluid-refrigerant agent-heat exchanger is formed to be a plate-type heat exchanger or an aluminum block-type heat exchanger, with a plate-type heat exchanger being characterized by a structure of a series of superposed, suitably shaped plates, whereas the aluminum block-type heat exchanger is formed as a block or comprises a plurality of assembled single block sections.

In a preferred improvement, the method according to the invention may provide for the cooling of the gaseous fluid to be effected exclusively or partially by the cold accumulator upon interruption or switching off or a stepped or continuous power reduction of the primary loop, wherein the convective heat or cold transfer between the cold accumulator and the pressure fluid-refrigerant agent-heat exchanger starts automatically or is regulated or controlled, in particular by valves.

BRIEF DESCRIPTION OF THE SEVERAL
VIEWS OF THE DRAWINGS

In the following, the invention will be explained in greater detail also with respect to further features and advantages by the description of exemplary embodiments and with reference to the attached drawings. It should be understood, however, that the invention is not limited to the precise arrangements and instrumentalities shown. Shown are:

FIG. 11b is a sectional view from above of the embodiment of a block-type heat exchanger according to FIG. 11a;

FIG. 12b is a sectional view from above of the embodiment of a soldered plate-type heat exchanger according to FIG. 12a.

DETAILED DESCRIPTION OF THE INVENTION

Figure 1:
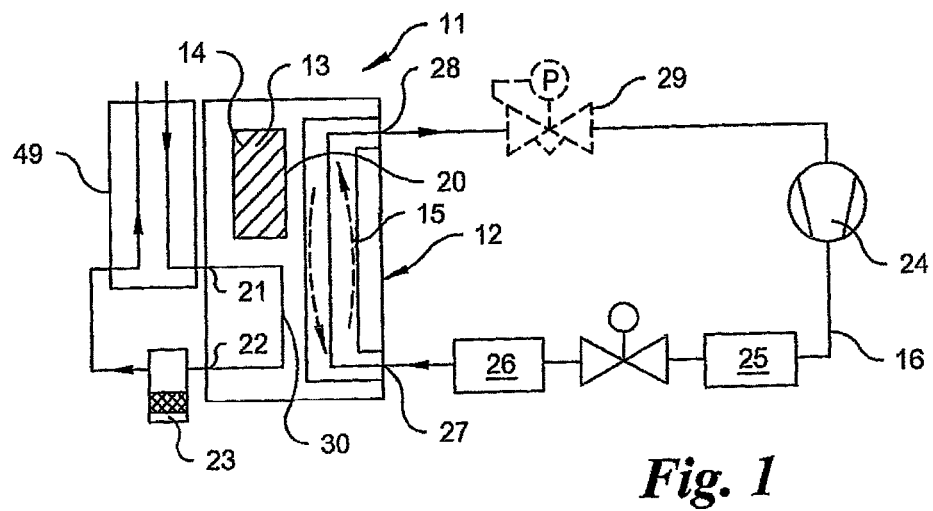
FIG. 1 is a schematic diagram of a first embodiment of a refrigerant dryer according to the invention.

In FIG. 1, a schematic diagram of a first embodiment of an inventive refrigerant dryer 11, in particular for drying compressed air, is illustrated. A central element of the refrigerant dryer 11 is a pressure fluid-refrigerant agent-heat exchanger 30, which first of all comprises a compressed air inlet 21 and a compressed air outlet 22, hence is traversed by a flow of compressed air to be dried, which may also be conveyed in a plurality of compressed air ducts 18 (presently not shown). A condensate separator 23 then follows downstream of the compressed air outlet 22 of the pressure fluid-refrigerant agent-heat exchanger 30 in a manner known per se, which separates the liquid condensed out by the cooling in the pressure fluid-refrigerant agent-heat exchanger 30 from the compressed air flow. The compressed air flow is then made available to further applications that require dry compressed air. Moreover, the present embodiment comprises an air-air-heat exchanger 49 which pre-cools the compressed air flow entering the compressed air inlet 21 by absorbing heat by the dried compressed air flow exiting the compressed air outlet 22.

The cooling of the compressed air flow, which is decisive for the drying process, occurs in the pressure fluid-refrigerant agent-heat exchanger 30 by a refrigerant conveyed in a primary loop 16. The primary loop 16 first of all comprises a refrigerant compressor 24 as a drive element, which conveys the refrigerant toward a liquefier 25. Regulated or controlled, as the case may be, the refrigerant is passed through an expansion element 26 downstream of the liquefier 25, so as to effect a cooling of the refrigerant in a manner known per se. The refrigerant enters the pressure fluid-refrigerant agent-heat exchanger 30 at a refrigerant inlet 27, cools down the pressure fluid there, and is subsequently conveyed with an increased heat content into an either spatially separated or directly adjacent accumulator-side heat exchanger 20, which is in thermal interaction with a cold accumulator 13, and then exits again at a refrigerant outlet 28 of the heat exchanger 30 toward the refrigerant compressor 24. Optionally, an evaporation pressure regulator 29 may further be arranged between the refrigerant outlet 28 and the refrigerant compressor 24.

The cold accumulator 13 is preferentially arranged in an area situated above—seen in relation to gravity—the pressure fluid-refrigerant agent-heat exchanger 30 and may specifically be configured as a latent heat accumulator.

The cold accumulator 13 hence comprises a cold accumulator medium 14, e.g. paraffin-based.

If the compressed air flow to be cooled does not draw on the entire cooling capacity of the primary loop 16, the excess cold energy may be transferred into the cold accumulator 13. In FIG. 1 this process is only indicated in simplified manner by the fact that the cold accumulator 13 is arranged in spatial vicinity to parts of the primary loop 16. Excess cold energy which is not required by the compressed air flow to be cooled can thus be stored in the cold accumulator 13.

In case of need, for example when there are only small compressed air flows or sufficient cold energy is stored in the cold accumulator 13, the primary loop 16 may also be switched off, which induces an internal convection-contingent or gravity-contingent circulation within parts of the primary loop 16 (e.g., a discharge loop 15 marked by the two oppositely-directed dashed arrows) in such a manner that the refrigerant absorbs heat in lower areas of the primary loop 16, in relation to the direction of gravity, by the compressed air to be cooled, evaporates this refrigerant then ascending with a higher heat content toward the cold accumulator 13, emits heat there and condenses, and descends again due to gravity after heat emission within the primary loop 16, so as to there again cool down the compressed air. Those parts of the primary loop 16 in which the heat exchange takes place are marked by the two oppositely-directed dashed arrows.

The embodiment according to FIG. 1 is characterized in that both the accumulator-side heat exchanger 20 and the pressure fluid-refrigerant agent-heat exchanger 30 are integrated into a heat exchanger arrangement forming one common component 12.

During the operation of the refrigerant compressor 24 or the primary loop 16, the refrigerant sequentially flows through the area defined as the pressure fluid-refrigerant agent-heat exchanger 30 and subsequently through the accumulator-side heat exchanger 20. The direction of flow with respect to the refrigerant inlet 27 and the refrigerant outlet 28 can, however, also be reversed so that during the operation of the refrigerant compressor 24, the common component 12 may also be traversed in the opposite direction if desired.

During a standstill of the refrigerant compressor 24 or the primary loop 16, a refrigerant circulation takes place along the above-designated portions of the primary loop 16 in which the refrigerant evaporates in the area of the pressure fluid-refrigerant agent-heat exchanger 30 and condenses again in the upper area, hence in the area of the cold accumulator 13. As an alternative, a respective evaporation and condensation may also be replaced by a thermal convection of the refrigerant in a single phase.

The common component comprising the accumulator-side heat exchanger 20 and the pressure fluid-refrigerant agent-heat exchanger 30 is in particular characterized by the following features:

(a) the refrigerant path extends at least substantially over the entire height of the heat exchanger which forms the common component 12;

(b) relative to gravity, the refrigerant path is in thermal contact with the compressed air path in the lower area of the heat exchanger constituting the common component 12; and (c) relative to gravity, the refrigerant path is in thermal contact with the cold accumulator 13 or the cold accumulator medium 14 in the upper area of the heat exchanger constituting the common component.

Figure 2:
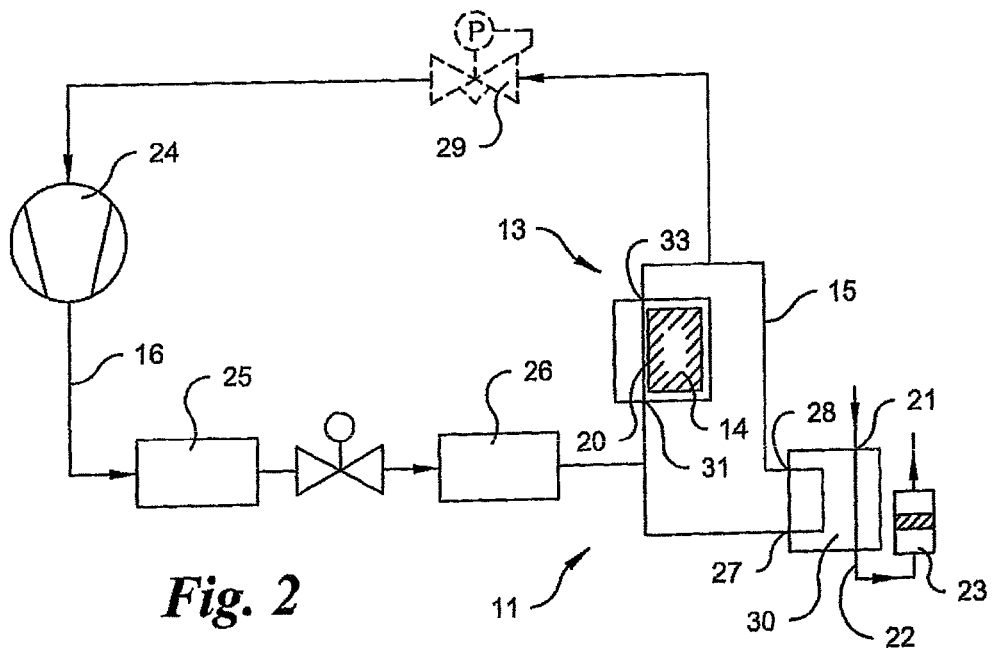
FIG. 2 is a schematic diagram of a second embodiment of a refrigerant dryer according to the invention.

In FIG. 2, a schematic diagram of a second embodiment of the refrigerant dryer according to the invention is illustrated, wherein the accumulator-side heat exchanger 20 and the pressure fluid-refrigerant agent-heat exchanger 30 in this embodiment are realized to be spatially separated and are traversed in parallel during operation of the refrigerant compressor 24 and the primary loop 16, respectively.

In this arrangement, a lower connection 31 of the accumulator-side heat exchanger 20 is arranged above the pressure fluid-refrigerant agent-heat exchanger 30 and is joined to the lower connection thereof defining the refrigerant inlet 27. Likewise, an upper connection 33 of the accumulator-side heat exchanger 20 is joined to an upper connection 33 of the pressure fluid-refrigerant agent-heat exchanger 30 defining the refrigerant outlet 28.

During a standstill of the refrigerant compressor 24, refrigerant condenses in the accumulator-side heat exchanger 20 and flows through the lower connection 31 of the accumulator-side heat exchanger 20 into the refrigerant inlet 27 of the pressure fluid-refrigerant agent-heat exchanger 30, where it evaporates and is conveyed back to an upper connection 33 of the accumulator-side heat exchanger 20 of cold accumulator 13 through the refrigerant outlet 28 of the pressure fluid-refrigerant agent-heat exchanger 30.

In the embodiment according to FIG. 1, as well as in the embodiment according to FIG. 2, the already mentioned evaporation regulator 29 may be used to avoid the risk of freezing caused by evaporation pressures being too low.

Figure 3:
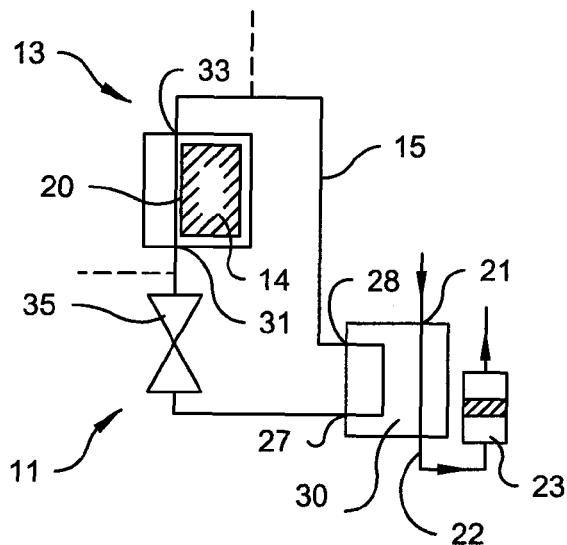
FIG. 3 is a partial schematic diagram showing a modification of the embodiment according to FIG. 2.
Figure 4:
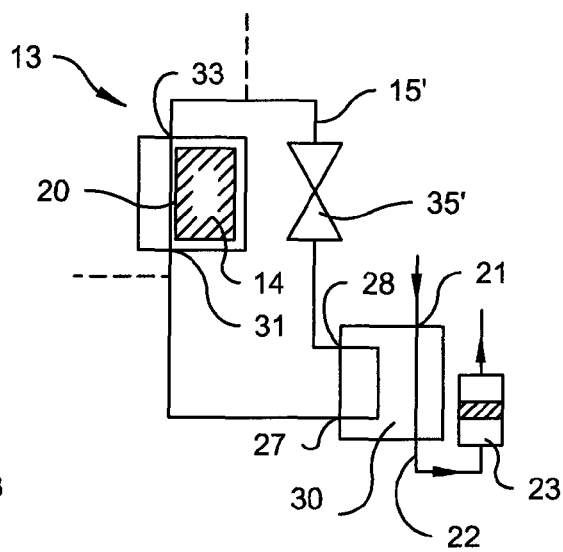
FIG. 4 is a partial schematic diagram showing a modification of the embodiment according to FIG. 2 or 3.

In the embodiment according to FIG. 2, it is further possible to control the flow-through of the refrigerant through the pressure fluid-refrigerant agent-heat exchanger 30, while the refrigerant compressor 24 is on and/or off, by further control elements so as to guarantee the maintaining of the desired pressure dew point. For this purpose, a valve 35 may be provided, for example in front of the refrigerant inlet 27 of the pressure fluid-refrigerant agent-heat exchanger 30 (such as illustrated in FIG. 3). As an alternative, see the embodiment according to FIG. 4, such a valve 35' may also be arranged on or downstream of the refrigerant outlet 28 of the pressure fluid-refrigerant agent-heat exchanger 30. The valves 35, 35' may either be continuously variable or controlled in a pulsed manner. As control parameters, the temperature in the pressure fluid-refrigerant agent-heat exchanger and/or the temperature in the compressed air flow, in particular at the compressed air inlet 21 and/or the compressed air outlet 22 and/or the pressure dew point of the compressed air may be used.

Figure 5:
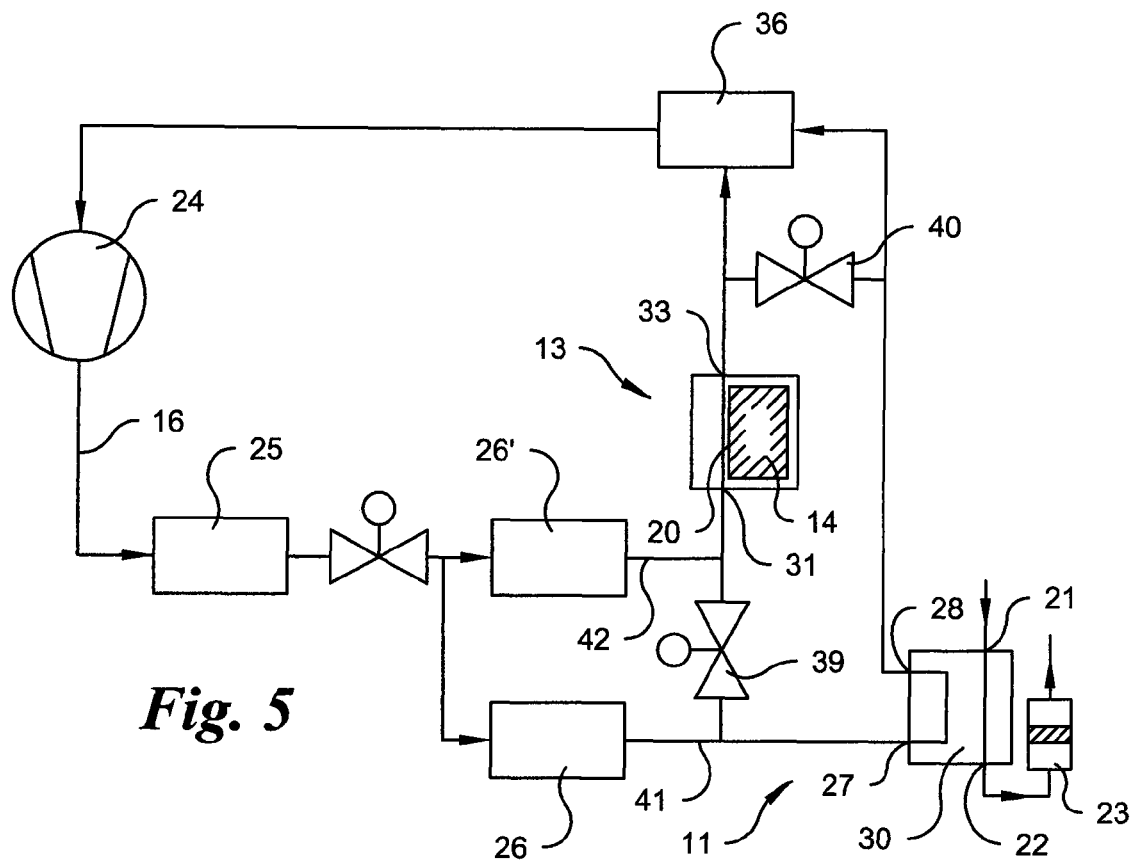
FIG. 5 is a schematic diagram of a third embodiment of a refrigerant dryer according to the invention.

A further modified embodiment of the refrigerant dryer according to the invention is shown in FIG. 5. The arrangement here is such that another, in particular lower, evaporation temperature than in the pressure fluid-refrigerant agent-heat exchanger 30 is set in the accumulator-side heat exchanger 20. This enables the cold accumulator 13 to be cooled more efficiently without temperatures occurring in the pressure fluid-refrigerant agent-heat exchanger 30 which are too low for the compressed air. For this purpose and as can be seen from FIG. 5, the refrigerant is divided into a compressed air-side track 41 and an accumulator-side track 42 and is conveyed in parallel through two different expansion elements 26, 26', namely starting from a first expansion element 26 to the pressure fluid-refrigerant agent-heat exchanger 30. In parallel thereto, the refrigerant is conveyed through the second expansion element 26' to the accumulator-side heat exchanger 20. The proportionate division of the refrigerant flows is achieved by adjustment elements 36.

Figure 6:
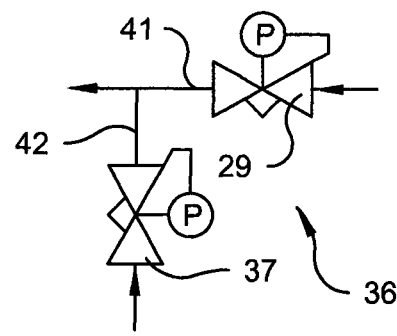
FIG. 6 is a partial schematic diagram showing a modification of the embodiment according to FIG. 5.
Figure 7:
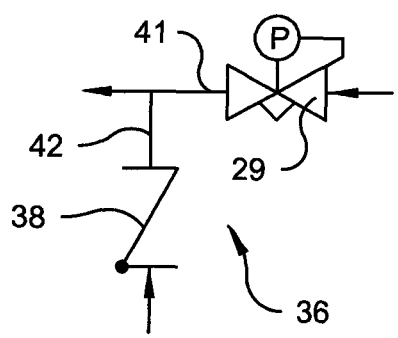
FIG. 7 is a partial schematic diagram showing a modification of the embodiment according to FIG. 5 or 6.
Figure 8:
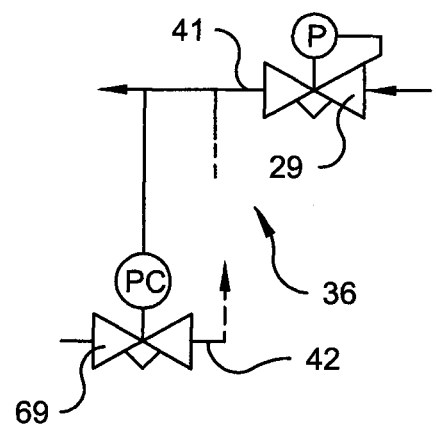
FIG. 8 is a partial schematic diagram showing a modification of the embodiment according to FIG. 5, 6 or 7.

Examples of this are illustrated in FIGS. 6, 7 and 8. The adjustment element 36 in the embodiment according to FIG. 6 is structured as follows: The evaporation pressure in the pressure fluid-refrigerant agent-heat exchanger 30 is kept at a minimum value by an evaporation pressure regulator 29. If the restriction effected in this evaporation pressure regulator 29 in part load operation leads to the suction pressure of the refrigerant compressor 24 falling below a set pressure of a start control 37, which is provided downstream in the accumulator-side track of the primary loop 16, meaning at or downstream of the upper connection 33 of the accumulator-side heat exchanger 20, the mentioned start control 37 will open so that excess refrigerant is conveyed across the accumulator-side heat exchanger 20 and used for cooling the cold accumulator 13.

An embodiment deviating from this is illustrated in FIG. 7. Here, a check valve 38 is arranged in the accumulator-side track 42 of the primary loop 16 downstream of the accumulator-side heat exchanger 20. The structure in principle hence corresponds to the embodiment according to FIG. 6, yet the start control 37 according to FIG. 6 is replaced by a check valve 38 or a differential pressure valve, so that it is not the absolute pressure which is decisive for the opening of the check valve 38, but the pressure difference between the evaporation pressure in the accumulator-side heat exchanger 20 and the suction pressure of the refrigerant compressor 34.

A further possible embodiment of the adjustment element 36 is illustrated on the basis of FIG. 8, wherein first of all the evaporation pressure regulator 29 causes a restriction at part load in the compressed air-side refrigerant track. When this restriction causes the falling short of a threshold, a pressure-controlled electric expansion valve 69 will open, which replaces the expansion element 26' in this respect, and clear the refrigerant path through the accumulator-side heat exchanger 20, while simultaneously expanding and cooling the refrigerant.

Independent of the specific configuration of the adjustment elements 36, a circulation is started in all variants of the embodiment illustrated in FIG. 5, analogously to the embodiment according to FIG. 2, once the primary loop 16 or the refrigerant compressor 24 is stopped. In this case, the lower connection 31 of the accumulator-side heat exchanger 20 is joined via circulation valves 39, 40 to the refrigerant inlet 27 of the pressure fluid-refrigerant agent-heat exchanger 30 and the refrigerant outlet 28 of the pressure fluid-refrigerant agent-heat exchanger 30 with the upper connection 32 of the accumulator-side heat exchanger 20, as already described on the basis of the embodiment according to FIG. 2. A convection-driven circulation may then begin between the cold accumulator 13 and the pressure fluid-refrigerant agent-heat exchanger 30, so that the cold accumulator 13 will be discharged and the compressed air correspondingly cooled at a switched-off primary loop 16. Preferentially, the circulation valves 39, 40 are switched simultaneously to the switching on or off of the refrigerant compressor 24; i.e., are closed when the refrigerant compressor 24 is switched on and are opened when the refrigerant compressor 24 is switched off.

Figure 9:
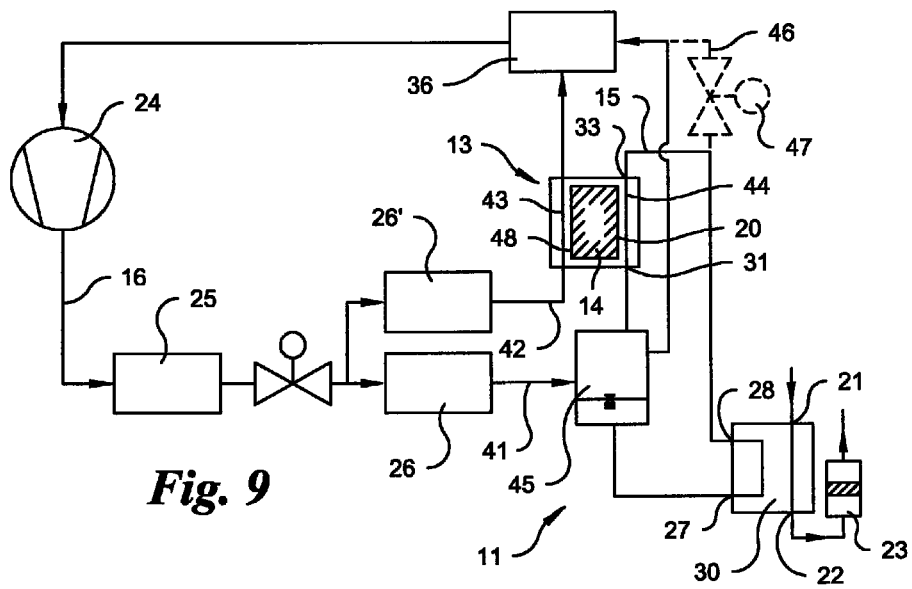
FIG. 9 is a schematic diagram of a fourth embodiment of a refrigerant dryer according to the invention.

A further embodiment of a refrigerant dryer according to the invention is illustrated in FIG. 9. As with the embodiment according to FIG. 5, a splitting of the refrigerant flow into a compressed air-side track 41 and an accumulator-side track 42 initially takes place here as well. Here also, an expansion element 26 is provided in the compressed air-side track 41 and an expansion element 26' is provided in the accumulator-side track 42. This in turn enables an evaporation level to be provided in the accumulator-side heat exchanger 20 which differs from that in the pressure fluid-refrigerant agent-heat exchanger 30.

The accumulator-side heat exchanger 20 in the presently proposed embodiment is formed to have two separate refrigerant paths, namely a charge refrigerant path 43 and a discharge refrigerant path 44 which is part of the discharge loop 15. A loading heat exchanger 48 is thus defined between the charge refrigerant path 43 and the cold accumulator medium 14 of cold accumulator 13. In contrast to the afore-mentioned configurations, cooling and warming of the cold accumulator medium 14 thus occurs in different areas of the accumulator-side heat exchanger 20. Due to that, the pressure fluid- refrigerant agent-heat exchanger 30 and the discharge fluid path 44 of the accumulator-side heat exchanger 20 may be in permanent communication, and stop elements, in particular the circulation valves 39, 40 explained on the basis of the embodiment according to FIG. 5, are not required between them. The refrigerant circulation during a standstill of the refrigerant compressor 24 corresponds to the circulation of the embodiment according to FIG. 2 or FIG. 5, wherein the refrigerant exiting on the discharge loop 15 from the cold accumulator 13 in the direction of the pressure fluid-refrigerant agent-heat exchanger 30 flows through a refrigerant collector 45, which is also fluidically connected to the expansion element 26 so that when the primary loop 16 is running, refrigerant from the expansion element 26 will enter the refrigerant collector 45.

To prevent heat from being introduced into the cold accumulator 13 during the cooling of the cold accumulator 13 by the refrigerant which exits from the pressure fluid-refrigerant agent-heat exchanger 30 condensing, an additional refrigerant duct 46 may connect the upper connection 34 of the pressure fluid-refrigerant agent-heat exchanger 30 to the adjustment element 36, wherein a stop element 47 may be provided in this additional refrigerant duct 46. Due to the opening of the stop element 47 during the reduction of the cold accumulator 13 heat content, the refrigerant of the pressure fluid-refrigerant agent-heat exchanger 30 will then flow directly to the adjustment element 36 and from there into the refrigerant compressor 24. As an alternative, the expansion element 26' may also be directly connected to the refrigerant collector 45.

Figure 10:
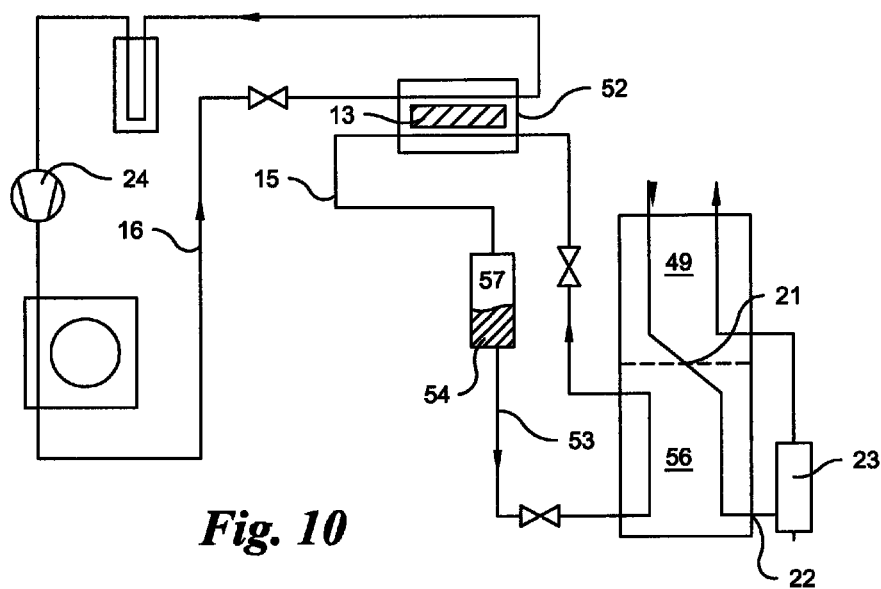
FIG. 10 is a schematic diagram of a further embodiment of a refrigerant dryer according to the invention.

A further embodiment of a refrigerant dryer according to the invention is illustrated in FIG. 10. In contrast to the refrigerant dryers shown thus far, the present refrigerant dryer comprises a closed intermediate loop which is configured as a transfer loop 53 which, in terms of fluid technology, is separated from the primary loop 16. The transfer loop 53 comprises a primary loop-transfer-heat exchanger 52 and a compressed air-side heat exchanger 56, which functionally corresponds to a pressure fluid-refrigerant agent-heat exchanger. The transfer loop 53 permits an indirect heat exchange between the primary loop 16 and the compressed air flow to be dried, which optionally may also be pre-cooled in an air-air-heat exchanger 49 before entering the refrigerant dryer. In the present embodiment, the cold accumulator 13 is integrated within the primary loop-transfer-heat exchanger 52 or thermally coupled to same.

In the present case, the primary loop 16 comprises a refrigerant compressor 24 as a drive element. The drive may be additionally supported, however, by further drive elements. In the operating state, the refrigerant of the primary loop 16 flows through the primary loop-transfer-heat exchanger 52 for absorbing heat or emitting cold and extracts heat from the transfer fluid 54 of the transfer loop 53. The transfer fluid 54 is subsequently buffered or collected in a transfer fluid reservoir 57. The heat contained in the compressed air flow to be dried is emitted to the transfer fluid of the transfer loop 53 in the compressed air-side heat exchanger 56, whereby the transfer fluid again exhibits an increased heat content. This transfer loop 53 works analogously during a standstill of the refrigerant compressor. At the same time, the transfer fluid emits heat to the accumulator medium in the transfer heat exchanger.

In relation to the primary loop 16 and the compressed air flow, the transfer loop 53 is preferably arranged so that it can be operated as a gravity-driven convection loop. For this purpose, the transfer fluid reservoir 57 is arranged, related to gravity, above the compressed air-side heat exchanger 56, in order to enable a convective circulation of the transfer fluid in the transfer loop 53. The same refrigerant as in the primary loop 16 may be used as a transfer fluid.

The transfer loop 53 may also be configured to be an internal loop within a common component analogous to FIG. 1. In the upper area of the heat exchanger, the primary loop, the transfer loop and the accumulator will then be in thermal contact.

Due to the multi-stage heat exchanger between the primary loop 16 and the compressed air-conducting areas of the refrigerant dryer, the energy efficiency to be expected is relatively smaller as compared to the previously illustrated embodiments of the refrigerant dryer, however the regulating of the refrigerant dryer is simpler and more reliable. Furthermore, there are advantages with respect to the constancy of the pressure dew point as compared to the solution shown in FIG. 1, since the accumulator temperature may be selected to be lower.

In the embodiment of the refrigerant dryer shown in FIG. 10, the transfer loop 53 is provided with regulating elements to allow an even better maintaining of the constancy of the pressure dew point. Yet, it is also possible for the transfer loop 53 to be configured as merely passive; i.e., without separate regulating elements. A pump may of course also be used in this constellation as well.

Figure 11A:
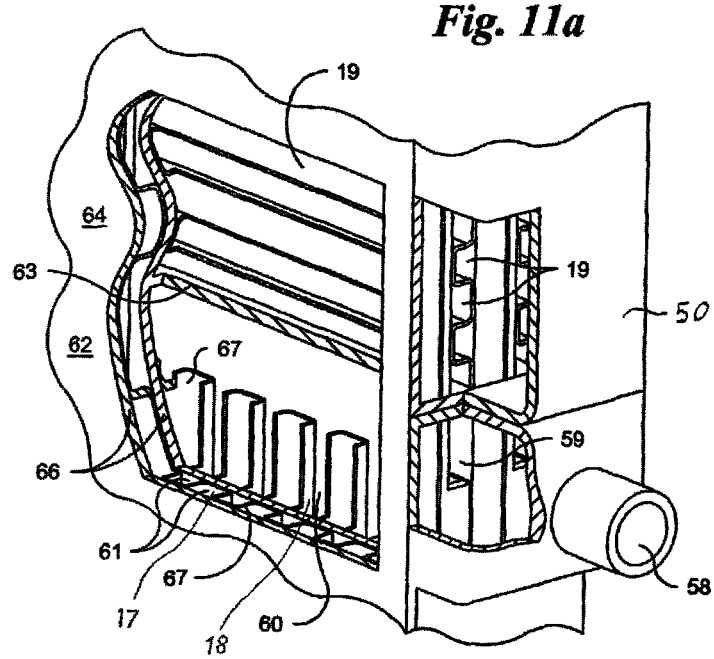
FIG. 11a is a perspective, partial sectional view seen from the side of an embodiment of a block-type heat exchanger useful in the invention.
Figure 11B:
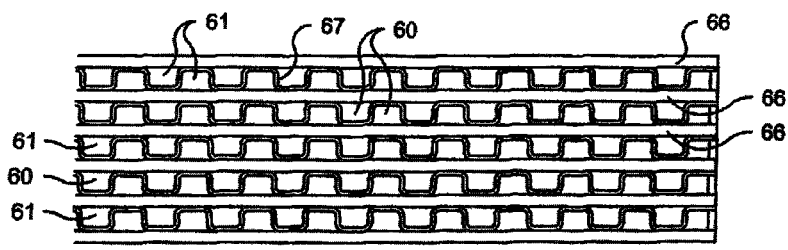

FIGS. 11a and 11b show one embodiment of a block-type heat exchanger for drying compressed air in two different partial sectional views. The depicted block-type heat exchanger is at least in part made of metal, preferably of aluminum. The functioning of the shown block-type heat exchanger in this case corresponds to that of a pressure fluid-refrigerant agent-heat exchanger with an integrated accumulator-side heat exchanger and thus constitutes an embodiment of a common component 12 comprising the pressure fluid-refrigerant agent-heat exchanger 30 and the accumulator-side heat exchanger 20.

The block-type heat exchanger comprises a compressed air-side heat exchanger 62 (corresponding to the pressure fluid-refrigerant agent-heat exchanger 30 according to FIG. 1) including a compressed air inlet 58. The compressed air flowing into the compressed air-side heat exchanger 62 is distributed to a plurality of compressed air inflows 59 and flows into subsequent compressed air passages 60. The compressed air passages 60 comprise a plurality of single compressed air ducts 18, which, however, are not sealed with respect to each other, and which are defined by a heat transfer element 67 in the form of a corrugated metal sheet. The heat transfer element(s) 67 is/are usually formed of folded metal sheets. The thereby resulting flow ducts can be shaped, for example, to be linear or undulatory, and may have bores, slots or moldings. To improve the heat transfer during flow-through, the elements may also be punched and folded such that offset duct portions situated one behind the other are created. In principle, the elements may be of any shape, provided they increase the heat transfer surface and enable the flow-through at an acceptable pressure loss and the filling with an accumulator medium, respectively. Further functions of the heat transfer elements may be a mechanical stabilization and, as the case may be, an improved heat transfer due to turbulences generated in flowing media.

Refrigerant passages 61, in which a refrigerant, e.g. of a primary loop, is provided for absorbing or transferring heat, are arranged directly adjacent the compressed air passages 60 and separated from same by partition walls 66. The refrigerant passages also each have a heat transfer element 67, which, in the form of a corrugated metal sheet, defines a plurality of refrigerant ducts 17, although are not delimited from each other.

The compressed air-side heat exchanger 62 is closed toward the top by a separation plate 63, which is followed above by a cold accumulator-side heat exchanger 64 (corresponding to the accumulator-side heat exchanger 20 according to FIG. 1). Apart from the refrigerant passages 61, in which the refrigerant of the primary loop flows and which in terms of fluid technology connect the cold accumulator-side heat exchanger 64 to the compressed air-side heat exchanger 62, the cold accumulator-side heat exchanger 64 further comprises a plurality of chambers 19 which are likewise further structured by a heat transfer element 67 or chambers 19. The structuring of the chambers 19 is oriented relative to their longitudinal extension to be perpendicular to the progression of the refrigerant ducts 17. A cold accumulator medium is provided within the chambers 19, which preferably comprises a phase transition material ("phase change material" or PCM). In one embodiment, the plurality of chambers 19 in which the cold accumulator medium is accommodated are fluidically connected to each other by at least one terminally arranged collecting vessel 50.

FIG. 11b shows a cross-section through the compressed air-side heat exchanger 62 from above. As can be seen from the illustration, the sequence of the compressed air passages 60 and the refrigerant passages 61 alternates. The two passages are separated from each other by partition walls 66. Heat transfer elements 67 are respectively provided in the compressed air passages 60 and the refrigerant passages 61 for increasing the heat transfer, which effects a better intermixing of the compressed air and the refrigerant and thus improve the heat transfer between the compressed air passages and the refrigerant passages. In the present case, the heat transfer elements 67 are configured in the form of corrugated metal sheets which define a plurality of individual compressed air passages and refrigerant passages, respectively. The corrugated metal sheets moreover may have surface depressions, bores or profiled shapes for enlarging the surface or for increasing the turbulences within the compressed air passages and the refrigerant passages, respectively.

Figure 12A:
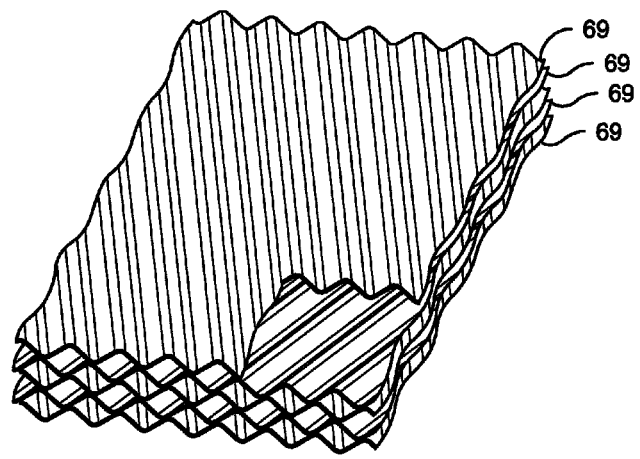
FIG. 12a is a perspective, partial sectional view of an embodiment of a soldered plate-type heat exchanger useful in the invention.
Figure 12B:
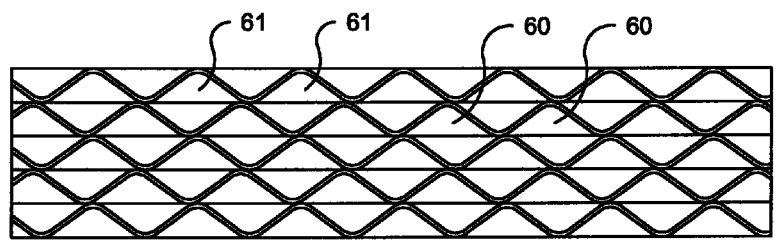

FIGS. 12a and 12b show an embodiment of a plate-type heat exchanger in two different partial sectional views. The plate-type heat exchanger illustrated in this case largely corresponds in its function to the block of the compressed air-side heat exchanger 62 shown in FIGS. 11a and 11b comprising the heat transfer elements 67 and the partition walls 66. In contrast to the embodiment according to FIG. 11a and FIG. 11b, however, the present plate-type heat exchanger comprises only a series of superposed wave-form plates 69 which may be fixed directly to each other, such as by soldering or welding, or indirectly such as by clamping. In this case, the wave-form plates 69 concurrently constitute the partition walls, so that there is an alternating sequence either of refrigerant and compressed air or refrigerant and accumulator medium here as well. A sectional view through a pressure fluid-refrigerant agent-heat exchanger 30 configured in this way is illustrated in FIG. 12b, so that there is an alternating of compressed air passages 60 and refrigerant passages 61 here.

The wave-form plates may be stacked one upon the other in such a manner, as shown in FIG. 12a, that the wave troughs and the wave crests cross in order to thereby achieve a better heat transfer.

The present invention enables a simple regulating of the power for a primary loop for a refrigerant for cooling the compressed air in a compressed air refrigerant dryer, wherein the power is regulated by switching a non-controlled refrigerant compressor on and off in combination with the opening or closing of one or more stop elements as needed.

The described embodiments may be used in a controlled refrigerant compressor for covering cold capacities below the lower limit of the control range of the refrigerant compressor.

The following parameter values may be used, for example, as the criteria for switching on or off the refrigerant compressor:

(a) suction pressure/evaporation pressure,
(b) temperature in the cold accumulator,
(c) temperature in the pressure fluid-refrigerant agent-heat exchanger or in the compressed air, in particular at the compressed air inlet and/or compressed air outlet,
(d) pressure dew point of the compressed air.

These parameters may also be evaluated at a fixed time or in combination depending on the operating state and used for driving the compressor/compressors.

Even in a stepped reduction of the refrigerant mass flow, e.g., in a composite refrigerant compressor or a single piston switch-off, the described variants may be advantageously used to supply an adapted cold capacity between the stages during part load conditions. In the case of a cooled cold accumulator and a low refrigerant mass flow, additional liquid refrigerant is supplied for cooling from condensation in the accumulator area. In the embodiment according to FIG. 5, a loop must be enabled for this purpose between the cold accumulator 13 and the pressure fluid-refrigerant agent-heat exchanger 30 by opening two circulation valves 39, 40.

The present invention also creates the possibility of spatially separating the accumulator medium from the pressure fluid-refrigerant agent-heat exchanger, so that new and advantageous structural shapes for refrigerant dryers become possible, by which even large-capacity cold accumulators may be realized in a low-cost manner.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A refrigerant dryer, in particular a compressed air refrigerant dryer, for drying a gaseous fluid while cooling the gaseous fluid using a refrigerant, the dryer comprising:

a pressure fluid-refrigerant agent-heat exchanger (30) in which a cooling of the gaseous fluid takes place directly or indirectly by a refrigerant conveyed in a primary loop (16), one or more refrigerant compressor/compressors (24) for operating the primary loop, a cold accumulator (13) having an accumulator-side heat exchanger (20) which couples an accumulator discharge fluid to a cold accumulator medium (14), an entirety of the cold accumulator (13) being arranged, with respect to a direction of gravity, above the pressure fluid-refrigerant agent-heat exchanger (30); and a discharge loop driven only by gravity-induced convection of an accumulator discharge fluid in a discharge state wherein the one or more refrigerant compressor/compressors (24) is not operating,
wherein the pressure fluid-refrigerant agent-heat exchanger (30) and the cold accumulator (13) are fluidically connected or may be brought into fluidic connection via the discharge loop (15) such that the accumulator discharge fluid having an increased heat content is conveyed through the discharge loop (15) for heat emission to the cold accumulator (13), emits heat there, and subsequently, having a reduced heat content, is again conveyed to the pressure fluid-refrigerant agent-heat exchanger (30), and
wherein the accumulator discharge fluid condenses in the discharge loop while emitting heat to the cold accumulator (13) and evaporates in the pressure fluid-refrigerant agent-heat exchanger (30) while absorbing heat.

2. The refrigerant dryer according to claim 1, wherein the discharge loop (15) is essentially only active during operating phases in which the refrigerant compressor/compressors (24) is/are switched off or is/are driven at a reduced power.

3. The refrigerant dryer according to claim 1, wherein the primary loop (16) and the discharge loop (15) are in fluidic connection within the pressure fluid-refrigerant agent-heat exchanger (30), so that the accumulator discharge fluid of the discharge loop (15) and the refrigerant of the primary loop (16) are foamed by the same refrigerant.

4. The refrigerant dryer according to claim 3, wherein the discharge loop (15) forms parts of the primary loop (16).

5. The refrigerant dryer according to claim 1, wherein the primary loop (16) and the discharge loop (15) are configured as loops which, in terms of fluid technology, are separated from each other and are in thermal interaction with each other through a primary loop-transfer-heat exchanger (52).

6. The refrigerant dryer according to claim 1, wherein the cold accumulator (13) is spatially separated from the pressure fluid-refrigerant agent-heat exchanger (30).

7. The refrigerant dryer according to claim 1, wherein the accumulator-side heat exchanger (20) and the pressure fluid-refrigerant agent-heat exchanger (30) are integrated into one common component (12).

8. The refrigerant dryer according to claim 1, wherein the gaseous fluid flows in a direction of flow through an air-air-heat exchanger (49) upstream and downstream of the pressure fluid-refrigerant agent-heat exchanger (30), in such a manner that the gaseous fluid cooled down in the pressure fluid-refrigerant agent-heat exchanger (30) pre-cools the gaseous fluid flowing into the pressure fluid-refrigerant agent-heat exchanger (30), wherein the pressure fluid-refrigerant agent-heat exchanger (30) and the air-air-heat exchanger (49) are integrated into one common component, and wherein the accumulator-side heat exchanger (20) is realized as a separate individual component or is integrated into one common component together with the air-air-heat exchanger (49) and the pressure fluid-refrigerant agent-heat exchanger (30).

9. The refrigerant dryer according to claim 1, wherein heat is extracted from the cold accumulator (13) in a charge state by the accumulator-side heat exchanger (20).

10. The refrigerant dryer according to claim 1, wherein, in the charge state, the cold accumulator (13) is in active communication with the refrigerant of the primary loop (16) through the accumulator-side heat exchanger (20) and/or a separate loading heat exchanger (48) for reducing the heat content of the cold accumulator medium (14).

11. The refrigerant dryer according to claim 1, wherein the thermal capacity of the cold accumulator (13), the cold accumulator medium (14) respectively, is increased in that the cold accumulator medium (14) performs a phase transition in its operating range.

12. The refrigerant dryer according to claim 1, wherein the cold accumulator medium (14) is selected such that its operating range is between −8° C. and 4° C.

13. The refrigerant dryer according to claim 1, wherein means for increasing the thermal conductivity are provided on or in at least one of the accumulator-side heat exchanger (20), a separate loading heat exchanger (48) of the cold accumulator (13), and the cold accumulator (13) itself, in order to effect a most efficient coupling possible of the accumulator discharge fluid or an accumulator charge fluid with the cold accumulator medium (14) of the cold accumulator (13).

14. The refrigerant dryer according to claim 1, wherein means for increasing the thermal conductivity in the cold accumulator (13) are formed in that substances, particles or fibers having high thermal conductivity are incorporated in the cold accumulator medium for improving effective thermal conductivity in the cold accumulator medium.

15. The refrigerant dryer according to claim 1, wherein the dryer splits a refrigerant guide into sections of two parallel tracks in the primary loop (16), namely a compressed air-side track (41) and an accumulator-side track (42), wherein the compressed air-side track (41) is guided across the pressure fluid-refrigerant agent-heat exchanger (30) and the accumulator-side track (42) is guided across the cold accumulator (13).

16. The refrigerant dryer according to claim 15, wherein a separate expansion element (26, 26') and/or similar adjustment elements (36) is/are respectively allocated to the compressed air-side track (41) and the accumulator-side track (42) to achieve different evaporation pressures.

17. The refrigerant dryer according to claim 1, wherein flow paths of the discharge loop (15) are partially or exclusively used for reducing the heat content of the cold accumulator (13) by the refrigerant of the primary loop (16).

18. The refrigerant dryer according to claim 17, wherein continuous refrigerant ducts (17) constitute sections of the discharge loop (15) and the continuous refrigerant ducts (17) extend at least substantially over an entire height of a common component (12) formed by the accumulator-side heat exchanger (20) and the pressure fluid-refrigerant agent-heat exchanger (30).

19. The refrigerant dryer according to claim 18, wherein in the discharge state, a convection-induced circulation is created within the refrigerant ducts (17) in the pressure fluid-refrigerant agent-heat exchanger (30), so that the refrigerant absorbs heat in the lower area of the refrigerant ducts (17) by the gaseous fluid to be cooled in compressed air ducts (18), the refrigerant evaporates and rises toward the cold accumulator (13) with an increased heat content, emits heat there and condenses, and then descends again under the influence of gravity, after heat emission within the refrigerant ducts (17), in order to again cool the gaseous fluid there in the compressed air ducts (18).

20. The refrigerant dryer according to claim 18, wherein the cold accumulator medium (14) is separately accommodated within a plurality of sealed chambers (19) which are each formed to be terminally closed duct portions, or within a plurality of chambers (19) fluidically connected to each other by at least one terminally arranged collecting vessel (50).

21. The refrigerant dryer according to claim 18, wherein the common component (12) comprising the accumulator-side heat exchanger (20) and the pressure fluid-refrigerant agent-heat exchanger (30) is formed to be a plate-type heat exchanger or an aluminum block-type heat exchanger.

22. A method for cold-drying a gaseous fluid in the refrigerant dryer according to claim 1, the method comprising the following steps:
reducing the heat content of the cold accumulator (13) by excess cooling capacity of the refrigerant of the primary loop in operating states in which the cooling of the gaseous fluid does not require any or only a fraction of available cooling capacity, and
discharging the cold accumulator (13) and cooling the gaseous fluid using the accumulator discharge fluid by a heat or cold transfer between the pressure fluid-refrigerant agent-heat exchanger (30) and the cold accumulator (13) in operating states in which the cooling of the gaseous fluid is not or is only partially caused by cooling capacity of the primary loop,
wherein, during circulation of the accumulator discharge fluid, the accumulator discharge fluid is subjected to cyclic phase transitions between liquid and vapor at a substantially equal pressure level.

23. The method according to claim 22, wherein the cooling of the gaseous fluid is effected exclusively or partially by the cold accumulator upon interruption, switching off or a stepped or continuous power reduction of the primary loop, and wherein the convective heat or cold transfer between the cold accumulator (13) and the pressure fluid-refrigerant agent-heat exchanger starts automatically or is regulated or controlled by valves.

24. The refrigerant dryer according to claim 1, wherein heat is extracted from the cold accumulator (13) in a charge state by a separate loading heat exchanger (48) by an accumulator charging fluid which is identical to or separate from the accumulator discharge fluid coupled to the cold accumulator medium (14).

25. The refrigerant dryer according to claim 1, wherein the cold accumulator medium (14) is selected such that its operating range is about 2° C. for structural configurations in which the accumulator-side heat exchanger (20) and the pressure fluid-refrigerant agent-heat exchanger (30) are integrated into one common component (12).

26. The refrigerant dryer according to claim 1, wherein the cold accumulator medium (14) is selected such that its operating range is about −3° C. for structural configurations in which the cold accumulator (13) is spatially separated from the pressure fluid-refrigerant agent-heat exchanger (30).

* * * * *